Nov. 25, 1947.  P. E. FISCHER  2,431,320
TRAY UNLOADER
Filed Aug. 2, 1944  3 Sheets-Sheet 1
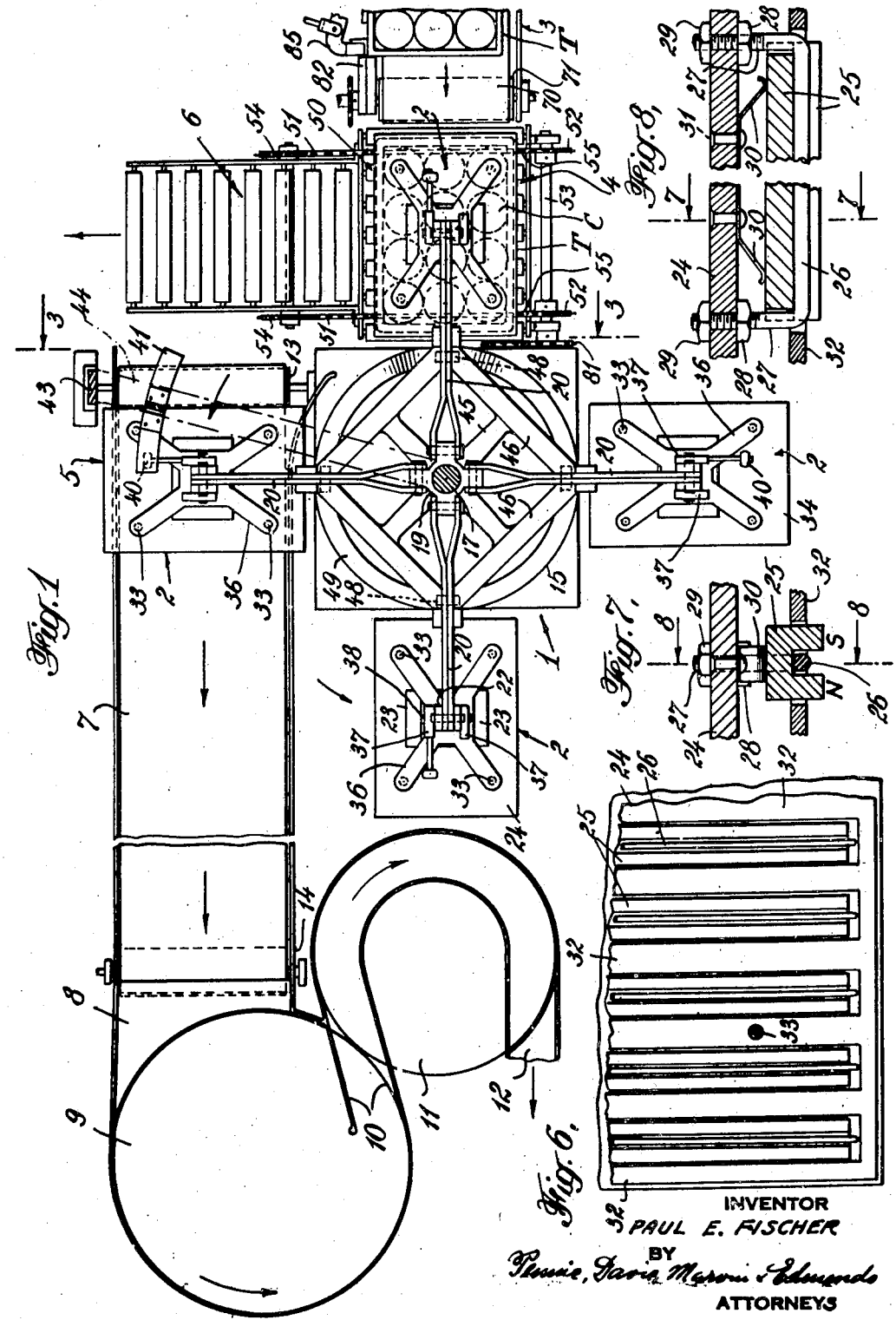
INVENTOR
PAUL E. FISCHER
BY
ATTORNEYS

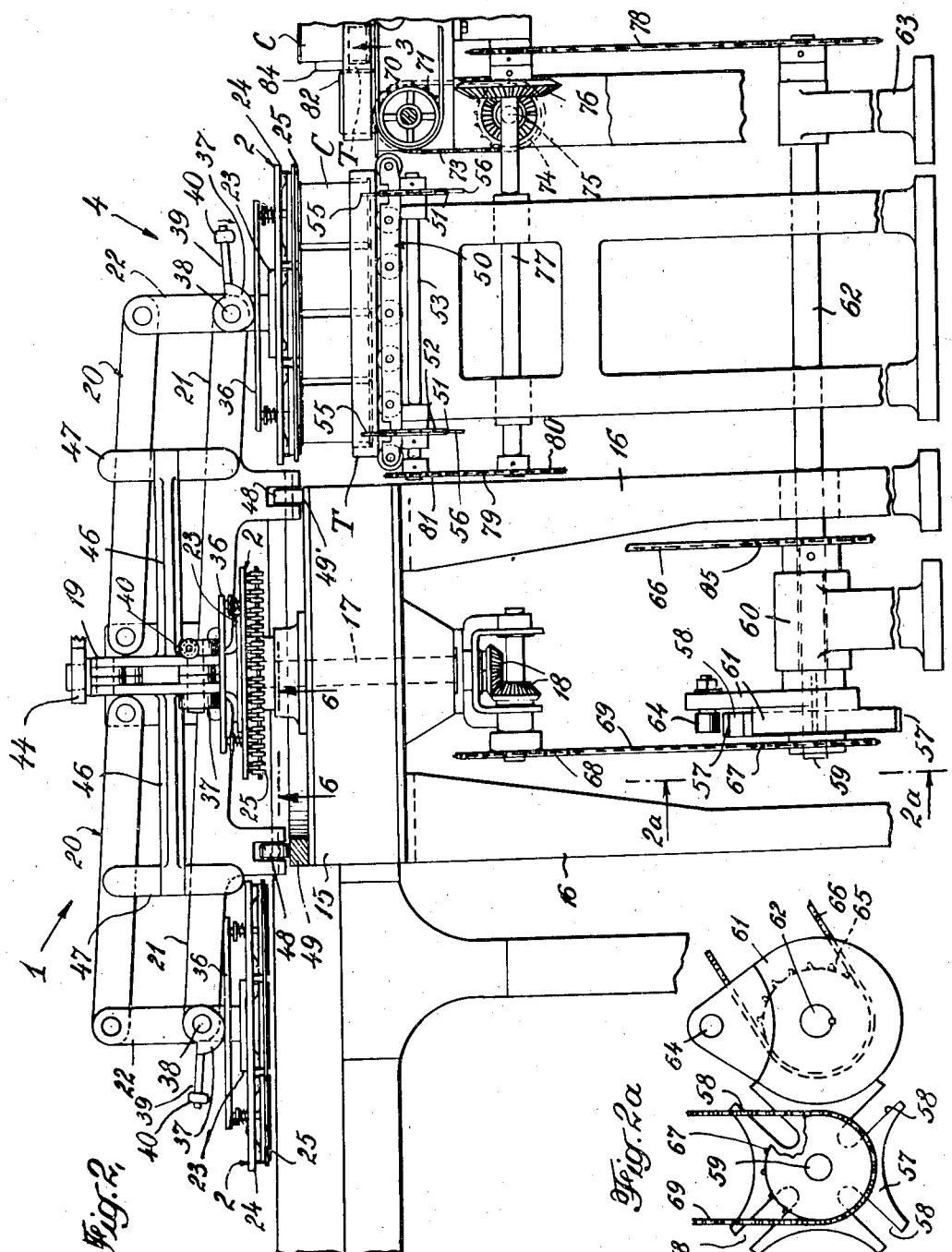

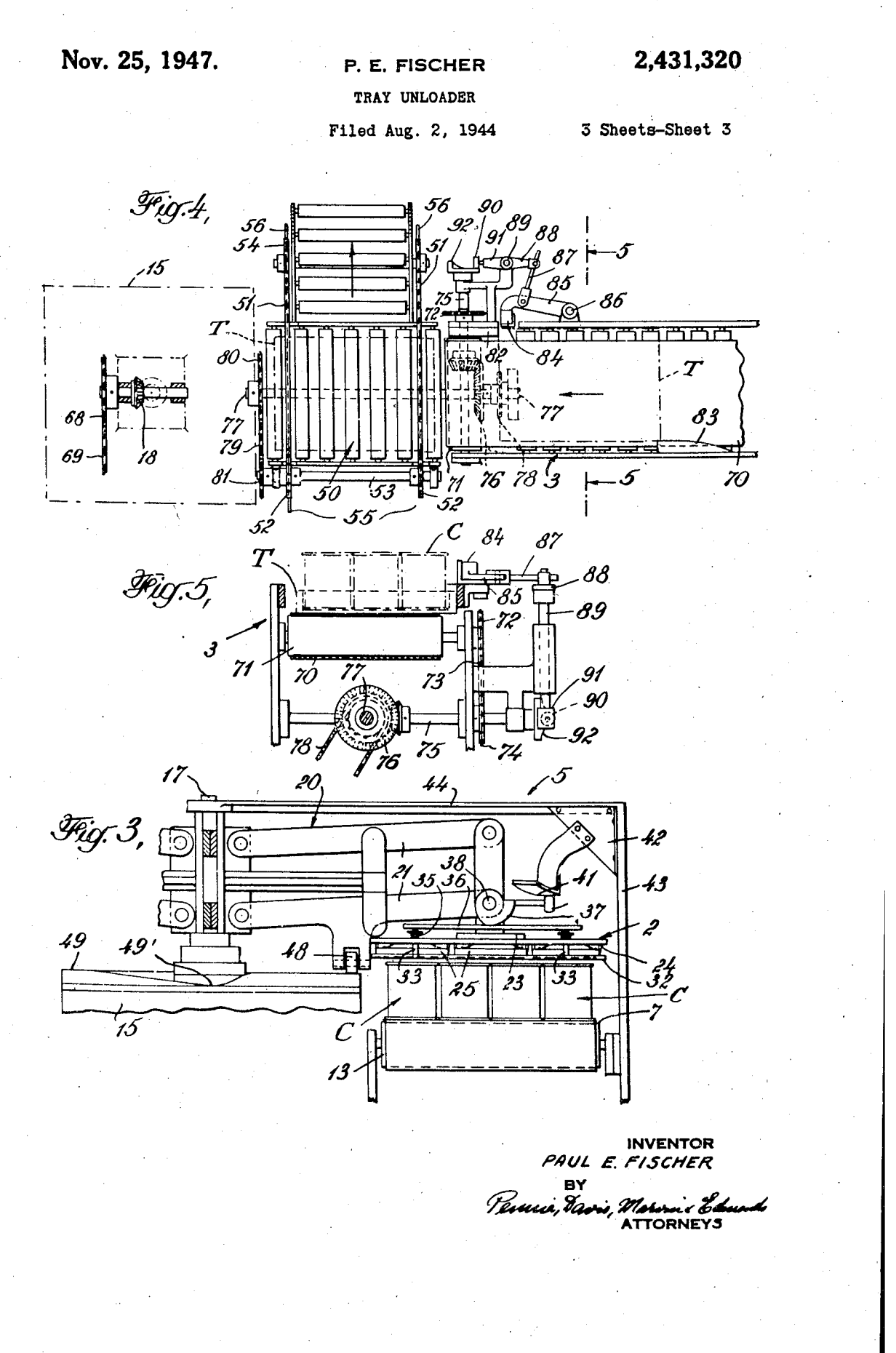

Patented Nov. 25, 1947

2,431,320

UNITED STATES PATENT OFFICE 2,431,320

TRAY UNLOADER

Paul E. Fischer, Portland, Conn., assignor to Standard-Knapp Corporation, Portland, Conn., a corporation of New York Application August 2, 1944, Serial No. 547,723

6 Claims. (Cl. 214—1.1)

1

This invention relates to apparatus for handling containers, and, more particularly to apparatus for unloading containers such as glass jars or metal cans from trays and feeding them in a single line to the apparatus which performs the next operation upon them.

In handling certain products, including certain food products, it is customary to pack them in containers such as cans or glass jars and complete the processing of the products but leave the containers unlabeled, storing them in trays from which, later on, the containers are removed, labeled and packed in cases for shipment. These storage trays usually hold a single layer of upright containers. The object of the present invention is to provide an improved apparatus for unloading these trays, that is to say, removing containers from the trays and arranging them in a single line convenient for feeding to the labeling machine and conveying the empty trays to a suitable point for storage or reuse.

Another object of the invention is to provide an apparatus of the type referred to which will operate automatically and continuously without attention from an operator.

Another object of the invention is to provide an improved apparatus for rearranging the containers from their static condition in the trays into a single moving line.

A further object of the invention is to provide an improved magnetic transfer apparatus for picking up articles at a given point or station and depositing them at a different station.

The invention will be understood from the consideration of the accompanying drawings by means of which one embodiment thereof is illustrated by way of example. In these drawings:

Fig. 1 is a plan view of the tray-unloading apparatus;

Fig. 2 is a side elevation of the apparatus shown in the major right-hand portion of Fig. 1;

Fig. 2a is a section of a detail, taken on line 2a—2a of Fig. 2;

Fig. 3 is a section taken on line 3—3 of Fig. 1;

Fig. 4 is a plan view of the timing mechanism;

Fig. 5 is a vertical section taken on line 5—5 of Fig. 4;

Fig. 6 is a fragmentary view drawn to an enlarged scale of the bottom of one of the lifting heads, as indicated by line 6—6 in Fig. 2;

Fig. 7 is a sectional view drawn to a still further enlarged scale of a construction detail, and is taken on line 7—7 of Fig. 8; and Fig. 8 is a sectional view taken on line 8—8 of Fig. 7.

2

Referring now to the accompanying drawings, the apparatus includes a rotary carrier indicated generally by reference numeral 1 which is provided with four magnetic lifting heads 2 conforming to the shape of the trays and each adapted to support all of the cans of a tray, in this instance 12 cans. Rotary carrier 1 is rotated with an intermittent motion, each movement carrying the four lifting heads in the counterclockwise direction, as viewed in Fig. 1, through an angle of 90°. The lifting heads thus move in a circular path. A filled tray conveyor 3 delivers trays filled with containers beneath the path of the lifting heads 2 in time relation to their rotation.

At each dwell between the intermittent movements of rotary carrier 1, one of the lifting heads 2 stops momentarily at a pickup station or position which may be indicated by numeral 4 over one of these filled trays indicated by reference character T. During this momentary dwell the containers C are picked up by the lifting head 2 which is at this position. By the next step movement of rotary carrier 1 this lifting head is advanced 90° to the release position indicated by numeral 5. During the early part of this movement the tray T is moved, by ejecting mechanism to be described later, at right angles to its previous movement on conveyor 3 onto an empty tray conveyor 6 which is inclined downwardly and along which the empty trays move to any suitable or convenient point.

Substantially at the release position 5 the cans are released from the lifting head 2 and dropped a distance of about half an inch onto a suitable receiver or receiving support which may, for example, be a converger belt 7 (see Figs. 3 and 1). Converger belt 7 moves continuously and carries the cans forward in the direction of the arrow in Fig. 1 over a stationary scuff plate 8 onto a continuously rotating converging disk 9. By means of belt 7 and disk 9 the cans are converged into a single line between upright guides 10. This single moving line of cans may be carried by a suitable conveyor directly to the labeling machine, or if it is desired to change the direction of the line between guides 10, reversing table or disk 11 may be employed which rotates in the opposite direction from converging disk 9, the outlet of the can guideways from this disk being indicated by numeral 12.

Converger belt 7 may be trained around horizontal rolls or pulleys 13 and 14, one of which may be driven in any suitable manner by any convenient power source such as an electric motor (not shown). Converging disk 9 and reversing disk 11 may also be driven by the same power source.

The lifting head 2 is preferably arranged to release the containers substantially at releasing position 5, but before the motion of the lifting heads under the intermittent rotation of rotary carrier 1 has ceased and also preferably while the velocity of the lifting head 2 is not greatly different from that of converging belt 7. In this way the rotary carrier 1, with its lifting heads 2 which operate as the unloading mechanism, cooperates with the converging apparatus 7, 9, since the lifting heads are arranged to move towards the discharge position 5 in the same general direction as the movement of converger belt 7, and, the acceleration of the cans being imparted to them by the rotation of the lifting heads, there is substantially no jerk imparted to the cans as they are released onto belt 7. Thus the operation of the converging apparatus is facilitated, the danger of upsetting the cans is greatly reduced and the speed of operation of the converging apparatus increased.

Rotary carrier 1 is supported by a substantially square frame 15 having legs 16, and comprises a vertical shaft 17 mounted for rotation at the center of frame 15. Shaft 17 is driven by bevel gearing 18 at its lower end, and, fixed to its upper end, there is a head 19 to which four arms 20 arranged at right angles to one another are pivoted. Each arm 20 comprises a parallelogram linkage mechanism consisting of upper and lower members 21 which are pivoted at their inner ends to head 19 in vertically spaced relation. At their outer ends members 21 are connected by a pair of vertical link members 22. The lower ends of link members 22 terminate in foot plates 23 which support a lifting head 2.

Each lifting head 2 comprises a flat rectangular plate 24 bolted or otherwise secured to foot plates 23. On the lower side of plate 24 there are mounted a plurality of elongated channel shaped permanent magnets 25, the pole faces N and S of these magnets extending along the lower surfaces of the legs of the channel section (Fig. 7).

The great majority of containers in use can be successfully handled by means of a magnetic lifting head, not only the so-called "tin" cans, but also glass jars having closures formed in whole or in part of such magnetizable material. A common form of such closure consists of a glass cap which is held in place by a metal ring screwed onto the mouth of the jar. This metal ring is usually made of thin steel sheet having a coating of tin or other rust preventive. Magnets 25 are mounted in floating relation to plate 24 so they may accommodate themselves to the tops of the containers and so that each container may be in contact with the pole faces of two or more of the magnets. To this end magnets 25 are mounted with the backs or upper surfaces of their web portions in spaced relation to the bottom of plate 24 and each magnet may be held in such position by means of a U-bolt 26 having a horizontal body portion which lies between the legs of the channel shaped magnet and which has upwardly extending shank portions 27. These are threaded as indicated in Figs. 7 and 8 and provided with nuts 28 engaging the lower surface of plate 24 and nuts 29 which are screwed against the upper surface of this plate. Nuts 28 form shoulders which fix the body portion of U-bolts 26 at a definite distance from the bottom of plate 24. Preferably leaf springs 30 are provided which may be secured to the lower surface of plate 24 by rivets 31 and which tend to maintain the pole faces of the magnets parallel with supporting plate 24.

In order to release the container from the magnets a stripping member 32 is provided which consists of a grid-like member made of non-magnetic material, such, for example, as aluminum. Stripper 32 is normally positioned above the pole faces of magnets 25, as shown in Figs. 7 and 8, and is movable downward to bring its lower surface below that of the pole faces, as shown in Fig. 3, for the purpose of forcing the cans free of the magnets. Stripping member 32 is supported by pins 33, four in number, which are arranged to slide in vertical apertures in plate 24. In the upper side of plate 24 pins 33 are surrounded with helical springs 35 which bear against washers beneath the heads of the pins and bias the pins upwardly, thereby holding stripper member 32 in its upper or normal position.

To move the stripper member 32 downwardly to the can release position, a forked member 36 having four fingers, one engaging the upper end of each pin 33, may be provided on the upper side of plate 24. Forked member 36 is engaged by a pair of rotary cams 37 fixed to a short pin or shaft 38 which also constitutes the pivotal connection between link 22 and the lower horizontal member 21 of each of arms 20. One of cam members 37 is provided with an operating lever 39, at the outer end of which is mounted a roller 40. Downward movement of lever 39 causes cams 37 to force forked member 36 downwardly, thereby moving stripping member 32 to its lowermost or stripping position.

In order to actuate the stripping mechanism just prior to the arrival of each of lifting heads 2 at the release position 5, a stationary cam member 41 is provided to engage roller 40 and force it downwardly during the last part of each intermittent movement of rotary carrier 1. Cam member 41 (Fig. 3) is mounted on a corner plate 42 which joins a vertical post 43 and a horizontal stationary member 44 which is mounted at its inner end at the top of shaft 17.

To transfer the rotary movement of shaft 17 to the pivoted arms 20 and at the same time permit the member comprising these arms to move vertically on their pivots, head 19 is provided with four spoke-like members 45 (Fig. 1) at the outer ends of which are laterally extending members 46 arranged in the form of a square, at each corner of which there is a pair of vertical shoes 47 spaced apart from each other by the thickness of horizontal members 21 of arms 20. These shoes 47 bearing one on each side of each of the members comprising arms 20 imparts the intermittent rotary movement of shaft 17 to these arms and maintains their 90° spacing, at the same time permitting arm members 21 to pivot vertically.

Arms 20 are supported in a substantially horizontal position by means of a roller 48 (Fig. 2) which is mounted in a bracket extending downwardly from about the center of each of the lower horizontal members 21. Rollers 48 move along the surface of a circular stationary track 49 resting on the top of frame 15. Circular track 49 is horizontal except in the vicinity of pick-up station 4. As each of the arms 20 and its lifting head 2 approaches this station, roller 48 encounters a depression 49' in track 49 (Fig. 3) and when the lifting head is exactly at this pick-up station 4, as shown in Figs. 1 and 2, the surface of track 49 is at the elevation shown in Fig. 2 which is substantially that of the upper surface of frame 16. This results in lifting head 2 being lowered to such an extent that the pole faces of magnets 26 are brought into contact with the tops of the containers C.

On the next intermittent movement of carrier 1, the carrier rotating in the direction of the curved arrow shown in Fig. 1 as referred to at the beginning of this description, roller 48 immediately encounters a steeply inclined cam surface in track 49, to the right of depression 49' as viewed in Fig. 3, which causes the lifting head 2 to be quickly shifted upwardly, lifting the containers out of their tray T at the pick-up station 4. The lifting head and its associated parts are now raised so that the bottoms of the containers C will clear converger belt 7 as they approach the release position 5. Fig. 3 shows the elevation of these parts but the cans have been stripped or released from the magnets 25.

At the pick-up station 4 the filled tray T is supported upon a horizontal roller table 50, the rollers of which are positioned to facilitate the delivery of the tray to the pick-up position 4 by conveyor 3. Hence in order to eject the tray onto the inclined empty tray conveyor 6 it has to be moved lengthwise of the roller table rollers. For this ejecting operation a pair of flight chains 51 are provided. These are carried at one end on a pair of drive sprockets 52, which are keyed to shaft 53, and at their opposite ends by a pair of idler sprockets 54. Chains 51 are provided with two pairs of flight projections 55 and 56, the two pairs being spaced at equal distances from each other lengthwise of chains 51 (see Fig. 4). Chains 51 are operated by mechanism about to be described in such manner as to cause one pair of the flight projections to engage the side of the tray T at pick-up position 4 and move it forward towards inclined empty tray conveyor 6 simultaneously with the commencement of an intermittent movement of a lifting head 2 from pick-up position 4 towards release position 5. The next tray to arrive at pick-up position 4 from conveyor 3 is engaged by the other pair of flight projections and moved onto empty tray conveyor 6 in a similar manner.

The mechanism for imparting intermittent motion to rotary carrier 1 will now be described. This comprises a Geneva mechanism shown in Figs. 2 and 2a. The driven member 57 is provided with four radial slots 58 and rotates on the left hand end of a stationary shaft 59 which is fixed in a supporting bracket 60. The driving member 61 of the Geneva mechanism is keyed to a long shaft 62 parallel with and spaced from shaft 59 as shown in Fig. 2a. Shaft 62 is mounted for rotation at the left hand end in bracket 60 and at its right hand end in a second bracket 63 which is beneath the end of conveyor 3. Driving member 61 is provided with a single driving pin 64 which, on each revolution of shaft 62 is adapted to engage one of the four slots 58 and rotate driven member 57 through ¼ of a revolution.

Shaft 62 may be driven by means of a sprocket 65 and chain 66 from any suitable power source. Driven member 57 of the Geneva mechanism is operatively connected with beveled gearing 18 which drives vertical shaft 17 of rotary carrier 1 by means of sprockets 67 and 68 and a connecting chain 69. For each revolution of shaft 62, which operates continuously, rotary carrier 1 will be rotated through ¼ of a revolution, carrying one of the lifting heads 2 from the pick-up position 4 to the release position 5. Moreover, such movement of carrier 1 takes place during ¼ of a revolution of shaft 62, carrier 1 remaining stationary during the remaining ¾ of each revolution of shaft 62.

The filled tray conveyor 3 comprises an endless belt or chain of linked metallic segments 70 carried by suitable supporting rollers, the driving roller 71 being shown in Figs. 1 and 3. This driving roller is operatively connected with main drive shaft 62. For this purpose a sprocket 72 (Fig. 5) is keyed to one end of the shaft of driving roller 71, and chain 73 is trained over this sprocket and around a sprocket 74 on a horizontal cross shaft 75. Shaft 75 is driven by means of beveled gearing 76 from a short horizontal shaft 77 at right angles to shaft 75 (Fig. 2). A chain 78 which is trained over sprockets on shaft 77 and shaft 62 completes the driving connections of endless conveyor belt or chain 70.

For the purpose of driving flight chains 51 so that their flight projections 55 and 56 will operate in timed relation with the intermittent rotation of carrier 1, shaft 77 extends from beneath the end of conveyor 3 to the left hand side of roller table 50 which supports the filled cases at pick-up position 4. A chain 79 is trained over a sprocket 80 on the left hand end of shaft 77 and a sprocket 81 which is keyed to shaft 53 to which the driving sprockets 52 of flight chains 51 are fixed.

It will be understood that although flight chains 51 operate with a continuous motion and rotary carrier 1 with an intermittent motion, the two are operated in timed relation, by the mechanism described, in such manner that one of the two pairs of flight projections 55 or 56 engages the side of the tray T at pick-up position 4 at substantially the same instant that each step-by-step advance of rotary carrier 1 commences. Also the arrangement is such that during the initial movement of lifting head 2 from the pick-up position 4, the tray T moves with the lifting head as one of the rollers 48 rides up the cam surface of circular track 49 to the right of depression 49' (Fig. 3) and lifts the cans out of the tray. The continued movement of flight chains 51 ejects the tray from the pick-up position onto the inclined empty tray conveyor 6.

As one lifting head 2 is carrying a charge of cans from pick-up position 4 to release position 5, another empty lifting head 2 is rotating towards the pick-up position. The next succeeding tray must be delivered to pick-up position 4 after the preceding tray has been ejected onto conveyor 6 and before this next lifting head 2 has arrived at the pick-up position. To accomplish this the endless belt 70 of filled tray conveyor 3 is operated at a comparatively high speed and a timing mechanism shown more particularly in Figs. 4 and 5 is provided which holds back the line of filled trays on conveyor 3, the conveyor sliding beneath the bottoms of the trays. At the proper instant this timing mechanism releases a single tray and allows it to shoot forward onto roller table 50 and pick up position 4.

This timing mechanism comprises a fixed stop 82 which is positioned at one side of conveyor 3, against which one forward corner of each tray T is urged by means of a cam member 83 on the opposite side of the conveyor as shown in Fig. 4. At the instant it is desired to feed the tray onto roller table 50 it is released from stop 82 by means of a plunger 84 formed on the end of a lever 85 which is pivoted at 86 to the frame of conveyor 3. Lever 85 is actuated by means of a link 87 which is adjustably pivoted to a short lever 88 fixed to the upper end of a vertical rock shaft 89. Shaft 89 is actuated by means of a roller 90 mounted at the end of a lever 91, similar to lever 88 but mounted at the lower end of shaft 89. Roller 90 engages and is actuated by a face cam 92 which is keyed to the end of shaft 75.

The above description of one embodiment of the invention is given for the purpose of disclosing how the invention may be carried out. It is to be understood, however, that other forms of apparatus may be devised which will operate without departing from the spirit of the invention. The scope of the invention is set forth in the appended claims. Although the apparatus of the invention has been described as an unloader, it is capable of use generally as a magnetic transfer apparatus, or as a magnetic loader or packer, the articles being picked up at the pickup station 4 and deposited in boxes or cases placed at the releasing position 5. Such packing apparatus is useful not only in handling cylindrical articles such as cans and jars having steel tops, but in handling articles having odd or fancy shapes, such as tapered or barrel-shaped cans or very shallow cosmetic jars having steel covers. It will be understood that the word "trays" is used in the appended claims in an inclusive sense to include all articles capable of being handled by the apparatus described.

I claim:

1. In apparatus of the class described, a rotary carrier having a plurality of outwardly extending arms, a lifting head carried by each of said arms, a conveyor to deliver trays filled with containers at a pick-up station adjacent the path of said lifting heads, a conveyor for receiving the containers extending from beneath said path, means for rotating said rotary carrier with a step-by-step movement causing lifting heads to stop respectively at the pick-up station and the tray receiving conveyor, a feeding device co-acting with said filled tray conveyor to cause filled trays to be fed to said pick-up station in timed relation to arrival of a lifting head at said station, means on said lifting heads operating automatically to pick up containers when said heads are at said pick-up station, mechanically operated means to release the containers when said heads are above said receiving conveyor, and mechanically operated means for removing each tray from said pick-up station as soon as it is emptied.

2. In apparatus of the class described, a rotary carrier having a plurality of outwardly extending arms, a lifting head carried by each of said arms, a conveyor to deliver trays filled with containers at a pick-up station adjacent the path of said lifting heads, a conveyor for receiving the containers extending from beneath said path, means for rotating said rotary carrier with a step-by-step movement causing lifting heads to pause respectively at the pick-up station and container receiving conveyor, a feeding device co-acting with said filled tray conveyor to cause filled trays to be fed to said pick-up station in timed relation to the arrival of a lifting head at said station, means on said lifting heads operating automatically to pick up containers at said pick-up station, mechanically operated means to release the containers when said heads are above said receiving conveyor, and mechanically operated means for ejecting the empty trays from said pick-up station, said means operating in timed relation to the advance of each lifting head from said pick-up station.

3. In apparatus of the class described, a rotary carrier, a plurality of arms extending outwardly from the carrier, a lifting head carried by each of said arms, a conveyor to deliver trays filled with containers at a pick-up station beneath the path of said lifting heads, a conveyor for receiving the containers extending from beneath said path, means for rotating said rotary carrier with a step-by-step movement causing lifting heads to pause respectively at the pick-up station and the container receiving conveyor, a feeding device co-acting with said filled tray conveyor to cause filled trays to be fed to said pick-up station in timed relation to the arrival of a lifting head at said station, means on said lifting heads to pick up containers, means for lowering each of said pivoted arms momentarily at said pick-up station to cause said pick-up means to pick up containers in a tray. at said pick-up station, mechanically operated means to release said containers onto said container receiving conveyor, and mechanically operated means at said pick-up station for ejecting an empty tray as a lifting head leaves the pick-up station.

4. In apparatus of the class described, a rotary carrier having a shaft pivoted for rotation on a vertical axis, means for rotating said carrier with a step-by-step movement, a plurality of arms pivotally mounted on said shaft for vertical movement and extending outwardly therefrom, a lifting head carried at the outer end of each of said arms, a circular horizontal track concentric with said vertical shaft, said arms each having a member movable on the upper surface of said track to support the arms in a substantially horizontal path of movement, a conveyor to deliver trays filled with containers at a pick-up station adjacent said path, a conveyor for receiving the containers extending from beneath said path, a feeding device co-acting with said filled tray conveyor to cause filled trays to be fed to said pick-up station in timed relation to the arrival of a lifting head at said station, said track having a cam-like depression therein to momentarily lower each of said arms and lifting head at said pick-up station, permanent magnets on said lifting heads to pick up containers from the tray at said pick-up station when said heads are successively lowered into contact with the containers, mechanically operated means for ejecting an empty tray from said pick-up station as a lifting head leaves the same, and means operated in timed relation to the arrival of a lifting head at said receiving conveyor for stripping the containers from said magnets.

5. In apparatus of the class described, a rotary carrier, a plurality of equally spaced arms extending outwardly therefrom and pivoted to the carrier for upward and downward movement, a lifting head carried by each of said arms having permanent magnets projecting from the lower surface thereof, conveying means to deliver trays filled with containers beneath the path of travel of said lifting heads, conveying means for receiving the containers extending from beneath said path, means for rotating said carrier intermittently through an angular distance equal to the spacing of said arms, one of said lifting heads pausing over each of said respective conveying means during the dwell between successive intermittent advances of said carrier, a feeding device co-acting with said filled tray conveying means to cause a filled tray to be delivered beneath said path prior to the arrival of a lifting head over said filled tray conveying means, means for lowering each lifting head momentarily as it pauses over said filled tray conveying means to cause said magnets to pick up containers from said tray thereon, an ejecting device moving synchronously with the lifting head carrying said picked up containers to remove the empty tray from said filled tray conveying means, and means operated in timed relation to the arrival of a lifting head above said receiving conveying means to strip said containers from the magnets.

6. In apparatus of the class described, a rotary carrier embodying a plurality of lifting heads, a conveyor to deliver trays filled with containers at a pick-up station adjacent the path of travel of said lifting heads, a conveyor for receiving the containers extending from beneath said path, means for rotating said rotary carrier with a step-by-step movement causing lifting heads to pause respectively at the pick-up station and container receiving conveyor, a feeding device co-acting with said filled tray conveyor to cause filled trays to be fed to said pick-up station in timed relation to the arrival of a lifting head at said station, means on said lifting heads operating automatically to pick up containers at said pick-up station, mechanically operated means to release the containers when said heads are above said receiving conveyor, and mechanically operated means for ejecting the empty trays from said pick-up station, said mechanically operated means operating in timed relation to the advance of each lifting head from said pick-up station.

PAUL E. FISCHER.

REFERENCES CITED

The following references are of record in the file of this patent:

UNITED STATES PATENTS

| Number | Name | Date |
|---|---|---|
| 512,381 | Keyes | Jan. 9, 1894 |
| 875,837 | McIntyre | Jan. 7, 1908 |
| 1,130,383 | Ellison | Mar. 2, 1915 |
| 1,139,070 | Phelps | May 11, 1915 |
| 1,461,222 | Myers | July 10, 1923 |
| 1,943,483 | Miller | Jan. 16, 1934 |
| 1,987,336 | Powell | Jan. 8, 1935 |
| 2,119,725 | Stecker | June 7, 1938 |
| 2,198,976 | Rober | Apr. 30, 1940 |
| 2,222,745 | Heidelmeyer | Nov. 26, 1940 |
| 2,253,283 | Minaker | Aug. 19, 1941 |
| 2,264,348 | Weygant | Dec. 2, 1941 |
| 2,326,794 | Nordquist | Aug. 17, 1943 |
| 2,355,722 | Goebel et al. | Aug. 15, 1944 |